(12) United States Patent
Maimets et al.

(10) Patent No.: US 9,052,051 B2
(45) Date of Patent: Jun. 9, 2015

(54) APPARATUS AND METHOD FOR INTERNAL REPAIR OF CONDUITS

(75) Inventors: Lembit Maimets, Toronto (CA); Garry Gladstein, Toronto (CA)

(73) Assignee: LINK-PIPE, INC., Richmond Hill, ON (CA)

( * ) Notice: Subject to any disclaimer, the term of this patent is extended or adjusted under 35 U.S.C. 154(b) by 938 days.

(21) Appl. No.: 12/757,724

(22) Filed: Apr. 9, 2010

(65) Prior Publication Data

US 2010/0263759 A1 Oct. 21, 2010

Related U.S. Application Data

(60) Provisional application No. 61/170,921, filed on Apr. 20, 2009.

(51) Int. Cl.
*F16L 55/16* (2006.01)
*F16L 57/00* (2006.01)
*F16L 55/163* (2006.01)

(52) U.S. Cl.
CPC .................................. *F16L 55/163* (2013.01)

(58) Field of Classification Search
USPC .............. 138/97, 98; 405/150.1, 184.2, 184.3
See application file for complete search history.

(56) References Cited

U.S. PATENT DOCUMENTS

| | | | | |
|---|---|---|---|---|
| 2,887,957 A | * | 5/1959 | Stalker | 415/115 |
| 3,477,506 A | * | 11/1969 | Malone | 166/207 |
| 3,700,265 A | * | 10/1972 | Dufour et al. | 285/15 |
| 4,124,985 A | | 11/1978 | Maimets | |
| 4,197,880 A | * | 4/1980 | Cordia | 138/99 |
| RE30,929 E | * | 5/1982 | Maimets | 405/150.1 |
| 4,723,579 A | * | 2/1988 | Hyodo et al. | 138/124 |
| 4,767,236 A | * | 8/1988 | Rice | 405/184.3 |
| 4,773,450 A | * | 9/1988 | Stanley | 138/98 |
| 5,035,539 A | * | 7/1991 | Kawafuji et al. | 405/184.2 |
| 5,042,532 A | * | 8/1991 | Gilleland | 138/98 |
| 5,096,332 A | * | 3/1992 | Kawafuji | 405/157 |
| 5,119,862 A | | 6/1992 | Maimets et al. | |
| 5,224,742 A | * | 7/1993 | Ooka et al. | 285/133.11 |

(Continued)

FOREIGN PATENT DOCUMENTS

| | | |
|---|---|---|
| CN | 2416332 Y | 1/2001 |
| CN | 1388335 A | 1/2003 |
| KR | 10-0810555 B1 | 3/2008 |

OTHER PUBLICATIONS

Decision on Grant of Jul. 21, 2014 of Russian Patent Application No. 2010115506, and English language translation.

(Continued)

*Primary Examiner* — Paul R Durand
*Assistant Examiner* — Vishal Pancholi
(74) *Attorney, Agent, or Firm* — Greenblum & Bernstein, P.L.C.

(57) ABSTRACT

An apparatus and method for internal repair of pipes and conduits, such as sewer pipes, pressurized water mains, water wells, and natural gas lines. The conduit repair apparatus includes a sleeve with locking mechanism to lock the sleeve in a tubular configuration. The sleeve is made of metallic or rigid plastic sheet having perforations. Some of the perforations are shaped like elongated slots and strips. A number of resilient O-rings are applied over the outer surface of the sleeve. A resilient membrane is applied over the O-rings. In one embodiment, a reinforcement band is used, and an additional layer of O-rings are included between the membrane and the reinforcement band.

28 Claims, 7 Drawing Sheets

(56) References Cited

U.S. PATENT DOCUMENTS

| | | | |
|---|---|---|---|
| 5,334,429 A * | 8/1994 | Imoto et al. | 428/36.2 |
| 5,351,720 A | 10/1994 | Maimets | |
| 5,465,758 A | 11/1995 | Graf et al. | |
| 5,725,026 A | 3/1998 | Maimets | |
| 5,868,434 A | 2/1999 | Brakland | |
| 5,950,682 A * | 9/1999 | Kiest, Jr. | 138/98 |
| 5,971,030 A | 10/1999 | Maimets | |
| 6,138,718 A | 10/2000 | Maimets | |
| 6,240,965 B1 | 6/2001 | Maimets | |
| 6,561,227 B2 * | 5/2003 | Cook et al. | 138/98 |
| 6,712,556 B2 * | 3/2004 | Penza | 405/183.5 |
| 6,775,894 B2 | 8/2004 | Hardin | |
| 7,000,642 B2 * | 2/2006 | Renteria | 138/98 |
| 7,004,681 B2 * | 2/2006 | Penza | 405/183.5 |
| 7,152,687 B2 * | 12/2006 | Gano | 166/386 |
| 7,191,801 B2 * | 3/2007 | Renteria | 138/98 |
| 7,401,647 B2 * | 7/2008 | Baycroft et al. | 166/277 |
| 7,503,349 B2 * | 3/2009 | Kamiyama et al. | 138/98 |
| 7,635,006 B2 * | 12/2009 | Edstrom | 138/98 |
| 7,708,032 B1 * | 5/2010 | Renteria | 138/98 |
| 7,861,744 B2 * | 1/2011 | Fly et al. | 138/98 |
| 8,091,640 B2 * | 1/2012 | Saltel | 166/285 |
| 2004/0045616 A1 * | 3/2004 | Cook et al. | 138/98 |
| 2005/0173115 A1 | 8/2005 | Maimets | |
| 2008/0193221 A1 * | 8/2008 | Lee et al. | 405/184.2 |
| 2010/0069716 A1 * | 3/2010 | Chin et al. | 600/114 |

OTHER PUBLICATIONS

Office action of Jan. 22, 2014 of Chinese Application No. 201010153141.9, and English language translation.

Office action of May 6, 2014 of Russian Office action No. 2010115506, and English language translation.

Office action of Aug. 4, 2014 of Chinese Application No. 201010153141.9, and English language translation.

* cited by examiner

APPARATUS AND METHOD FOR INTERNAL REPAIR OF CONDUITS

CROSS-REFERENCE TO RELATED APPLICATION

This application is based upon U.S. Patent Application No. 61/170,921, filed on Apr. 20, 2009, the disclosure of which is hereby incorporated-by-reference thereto in its entirety and the priority of which is claimed under 35 USC 119(e).

BACKGROUND OF THE INVENTION

1. Field of the Invention

The invention relates to methods and apparatuses for repairing conduits. More particularly, the invention is directed to methods and apparatuses for repairing damaged, weakened, or leaking conduits that are located in areas to which it is difficult to gain access, for example, sewer pipes, water mains, wells, and gas lines.

2. Background Information

Over a period of time, conduit systems for carrying water or wastewater become damaged, weakened, or otherwise begin to deteriorate and leak at the joints between adjacent sections. Such deterioration is caused by the settling of the surrounding earth adjacent the conduit system, by deterioration of the joints themselves over time, and/or by the growth of roots from trees and other plants.

In wastewater systems, wastewater can begin to leak out from damaged conduits and create problems of pollution. In addition, damaged sections can have a groundwater infiltration problem which increases the volume of water carried to the treatment facility, thereby overburdening it.

Further, deteriorated conduits for liquid conveyance systems, including sewer systems that result in leaks can soak the surrounding terrain, sometimes creating sinkholes and exacerbating drainage problems. Further, support for buildings, bridges, for example, provided by the terrain in which a leaking conduit is located, can become weakened, thereby risking additional property damage or more serious concerns including loss of life.

A variety of solutions to the problem of repairing buried conduit sections have been proposed in the art. The most common solution involves excavation around the damaged conduit section and either the repair or replacement of the damaged section. However, excavation is time-intensive and, particularly in urban areas, it creates additional problems.

Methods have also been developed for repairing a damaged conduit section from within and without the need for excavation. Such methods include simply the application of a grout material for sealing cracks and joints, for example. It is also known in the art to re-line damaged conduit sections with a liner that is expanded from a coiled configuration to a final configuration in which the liner is secured against the inner surface of the damaged conduit section.

Above-mentioned "no-dig" methods and apparatuses are disclosed, for example, in U.S. Pat. Nos. 5,119,862; 5,351,720; and 5,465,758, the disclosures of which are incorporated by reference thereto in their entireties.

Furthermore, in the repair of relatively high-pressure pipes and conduits, such as natural gas lines and water lines, there is usually a need to shut down a line, relieve pressure, and take it out from service. The same operations should be done for different periodic maintenance after repair as well.

Additional problems could be built up by external pressure exerted by a relatively high water level difference, such as in the case of water well exploitation. Similar problems could happen in the case of an external environment or internal fluid temperature changes.

Above-mentioned pressure or temperature changes cause diameter changes in the host pipe, and as a result, a certain gap between host pipe and repair sleeve can be formed. For instance, it has been known that an HDPE (High Density Polyethylene) pipe with an original internal diameter of 29 inches can increase in diameter up to 29.23 inches under a standard working pressure of 150 psi.

U.S. Pat. No. 6,138,718, the disclosure of which is hereby incorporated by reference thereto in its entirety, only partially solves this "gap problem." Methods and apparatuses disclosed in this patent can compensate for a nascent gap at the time of installation and for a certain short time thereafter. The reason for the subsequent failure relates to the fatigue of some materials, for instance, closed-cell plastic foam exposed to pressure loses in the gas enclosed within the cells. Another reason of the subsequent failure appears when the certain working pressure is applied to the host pipe, as well as to the self-locking sleeve, and unlocks it. For the same HDPE pipe, the increase circumference by ⅛ inch (3.175 mm) causes the sleeve to unlock, and it might happen at a pressure of 26 psi or an internal fluid temperature rapidly dropping by 78° C. (in the case of a stainless steel sleeve).

A similar problem appears in the case of the gap between a rigid host pipe and an installed CIPP (Cured-In-Place-Pipe) liner. This gap varies under an operating pressure, and as a result, any known sealing means at the ends of the CIPP liner will be destroyed.

SUMMARY

The invention improves upon known internal conduit repair methods and apparatuses. More specifically, the invention provides methods and apparatuses for internally repairing conduits with a sleeve that is self-locking according to known techniques, but which prevents the unlocking or a gap creation between the repair apparatus and host pipe.

Further, the invention provides methods and apparatuses that do not require significant internal pressures to be applied to the damaged conduit section and, therefore, that do not risk the possibility of additional damage to the damaged and/or weakened conduit section.

Additionally, the invention provides for the repair of damaged openings, which might be incorporated within a damaged conduit, with a seal that can prevent the groundwater infiltration into such conduit, including relatively high exfiltration pressure.

With regard to these and other features, the invention includes an expandable continuous perforated core, hereafter also referred to as a "sleeve," such as a stainless steel sleeve, or other structurally supportive material, e.g., rigid PVC, concrete, equipped with a locking mechanism and extending continuously over the entire area of damaged pipe. The choice of core material is determined by the chemical regime in the pipe. As shown in the drawings, referenced below (see, e.g., the coiled core of FIGS. 1,2 and the uncoiled core in FIG. 13), the perforations of the core extend along at least a majority of the circumference of the core.

A number of O-rings, made from solid resilient, elastic material, are applied over the outer surface of the sleeve. The quantity, the body diameter, and softness of such O-rings depend on possible conduit diameter change, from one side. From another side, such parameters of the O-rings depend on chosen installation pressure of the sleeve and step change in the sleeve diameter if a chosen locking mechanism is a step mechanism.

According to a particular embodiment of the invention, a sealing resilient membrane is applied over the O-rings. The thickness of the membrane depends on internal or external pressure and the dimension of the conduit's nature of damage.

In further embodiments of the invention, a reinforcement band is applied over the membrane, especially in the case when internal operating pressure is high and/or the conduit has a large leaking hole, or a wide leaking joint.

According to another embodiment of the invention, the reinforcement band is placed between the O-rings and the resilient membrane, and the additional layer of O-rings from solid resilient material are placed between the reinforcement band and the resilient membrane in order to restrict infiltration pressure between two adjacent O-rings and, by doing so, to decrease full external load on the core.

In yet another embodiment of the invention, a curable flexible sealant is applied on the sealing membrane.

In a further embodiment of the invention, the expandable perforated core is provided with outwardly bent circumferential edges to create a smooth transition from the conduit diameter to the sleeve diameter.

According to a further embodiment of the invention, some of the perforations in the sleeve as well as in the reinforcement band are elongated, slot-like, especially in the cases in which a conduit has an offset leaking joint, and/or two adjacent pipes with different diameters, and/or a joint having a circumferential protrusion such as a welding bead.

The installation of the described repair apparatus, according to the invention, can be accomplished by use of an inflatable plug at installation pressure, which compresses the O-rings so that the compression is kept under the infiltration pressure and/or conduit diameter changes. Once the apparatus is expanded by means of the plug and locked by a locking device or other type of fastener, the plug is removed.

The repair apparatus can be used to repair open joints, holes, cracks, corrosion and other damage.

BRIEF DESCRIPTION OF DRAWINGS

Other features and advantages of the present invention will become apparent from the detailed description of exemplary embodiments of the invention, which follows, when considering in the light of the accompanying drawings, in which.

DETAILED DESCRIPTION

Figure 1:
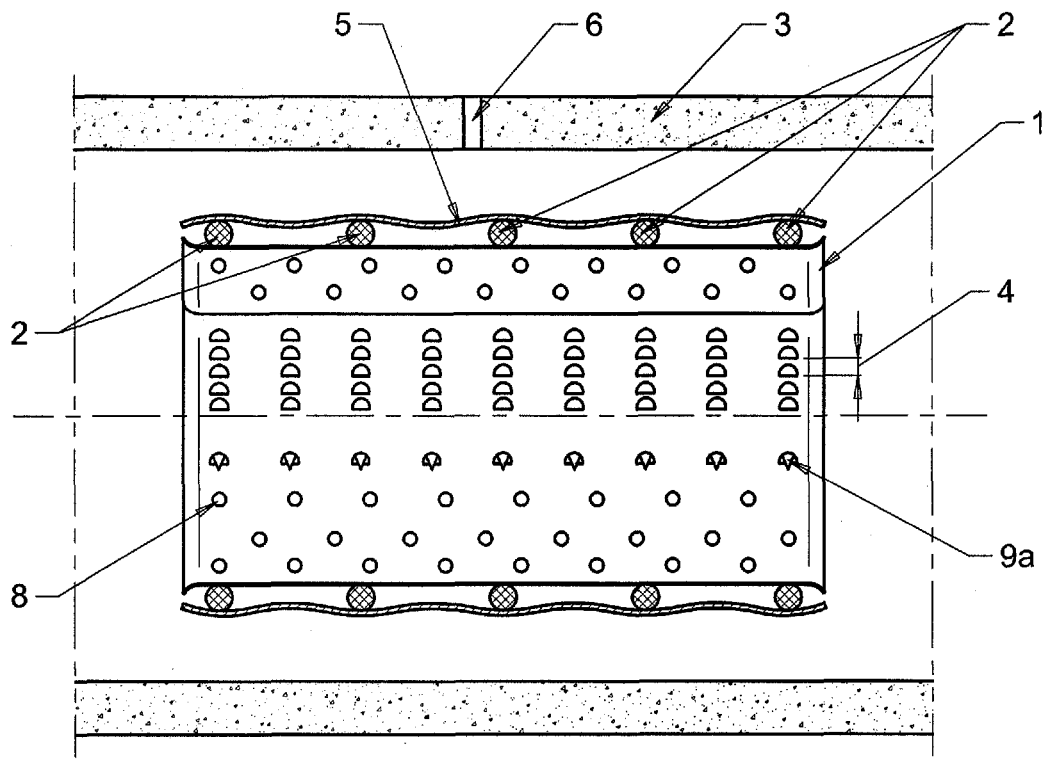
FIG. 1 is a longitudinal section of the sleeve layers illustrating the expandable core, in collapsed position, the set of O-rings, and the sealing resilient membrane.

FIG. 1 shows a repair apparatus in the over-coiled pre-installation configuration. The apparatus for internal repair pipes and conduits in accordance with this invention comprises of an expandable core 1, having perforations 8 and equipped with a locking mechanism 9 (shown in FIGS. 2, 4, 7 and 9). The choice of core material, for instance stainless steel, is determined by the chemical regime in the pipe. Further, a number of O-rings 2, made from solid resilient, elastic material, are applied over the outer surface of the core 1. The quantity, the body diameter, and softness of the O-rings 2 depend on possible conduit 3 diameter changes with internal/external pressure and/or temperature changes. From another side, such parameters of the O-rings depend on chosen installation pressure of the apparatus and steps 4 changes in the core 1 circumference, i.e., the incremental distance between successive locked positions of the expandable core 1, if a chosen locking mechanism 9 is a step mechanism. According to a particular embodiment of the invention, a sealing resilient, elastic membrane 5 is applied over the O-rings 2. The thickness of the membrane 5 depends on internal or external pressure and the dimension of the leaking hole or the width of an open joint 6 in the conduit 3. For the above-referenced example for an HDPE conduit, with a pinhole having a diameter of 0.04 inch (0.10 cm), or a leaking joint having a width of a circumferential opening of 0.04 inch, the repair apparatus could comprise, for example, an expandable SST core 1 having an axial length of 24 inches (61.0 cm), four to six O-rings 2 with a body diameter of 7/16 inch (1.11 cm), made of polyisoprene, having a durometer 50A, and a membrane 5 with a thickness within a range of 1/16-1/8 inch (0.16-0.32 cm), made of natural rubber having a durometer 45A. These materials and dimensions merely exemplary, and other materials and dimensions can be employed within the scope of the invention.

In another aspect of the invention, a curable flexible sealant can be applied directly on the sealing membrane 5, especially in the areas where the membrane 5 has the protruding undulations from the underlying O-rings 2.

Figure 2:
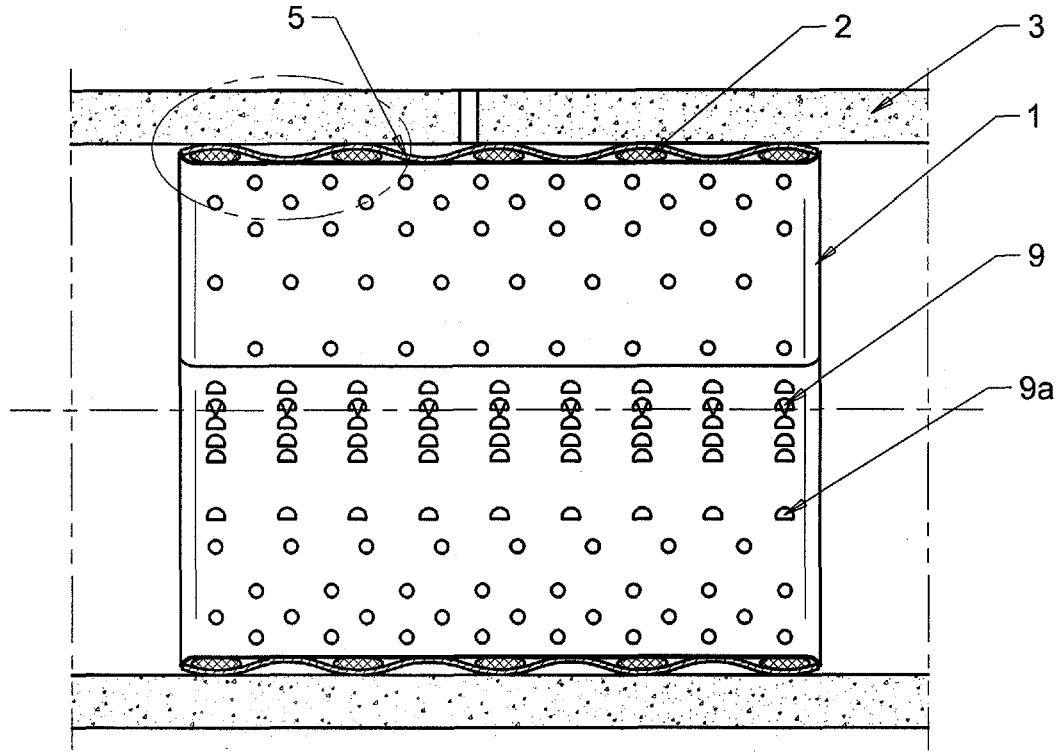
FIG. 2 is a longitudinal sectional view illustrating the same sleeve in the installed position.

FIG. 2 shows the repair apparatus in the installed position. In this position, the core 1 is locked by locking device 9 into tubular configuration, the solid resilient O-rings 2 are compressed into the oval cross-sectional shape, and the membrane 5 with or without curable flexible sealant is pressed to the internal wall of conduit 3.

Figure 3:
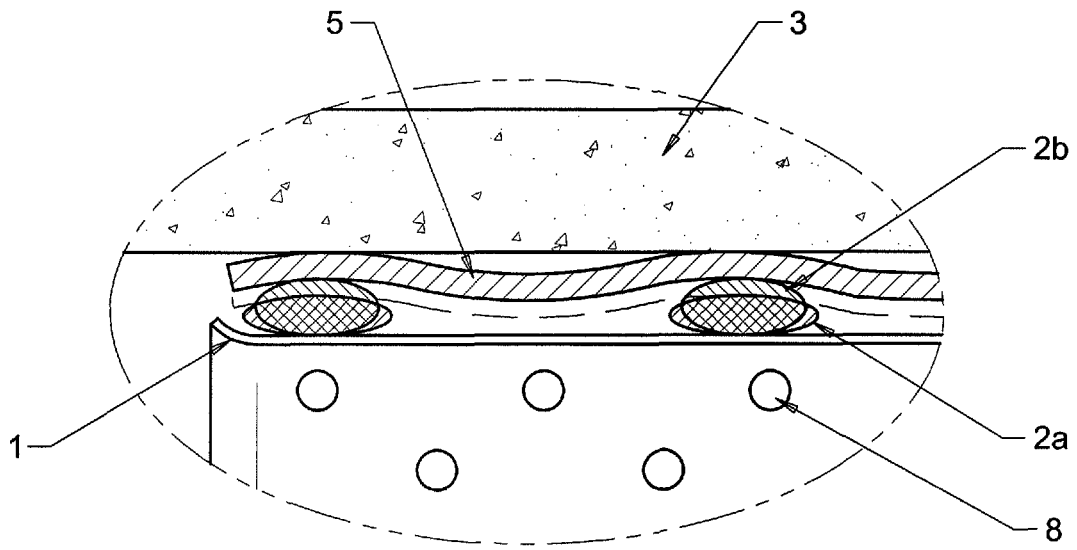
FIG. 3 is a longitudinal sectional view illustrating two different cross-sectional shapes of the O-rings before and after internal operating pressure is applied.

FIG. 3 illustrates an enlarged view of two different cross-sectional shapes of the O-rings 2 before and after internal working pressure is applied. The more compressed shape 2a illustrates a situation, when, for instance, the pressure pipe is taken out of service. The less compressed shape 2b illustrates situation, when working pressure is applied again.

FIGS. 4, 5, 6, and 7, in accordance with another embodiment of the invention, depict an additional reinforcement band 7, which is applied over the membrane 5, especially in the case when internal operating pressure P is high and/or the conduit 3 has a large leaking hole 6 or a wide leaking joint 6. In the non-limiting illustrated embodiment, the reinforcement band 7 extends continuously along the circumferential length of the core 1 to be initially pressed by three O-rings 2 to the wall of the conduit 3. The quantity of O-rings 2 under the band 7 may vary from one to three, for example. The repair apparatus which comprises the reinforcement band 7 made from SST sheet, 20 gauge (0.0375 inch/0.1 cm), with reference to the aforementioned example of an HDPE conduit, can stop leaking through the hole 6 having a diameter up to 3 inches (7.62 cm), or through a 3-inch separated joint.

Figure 8:
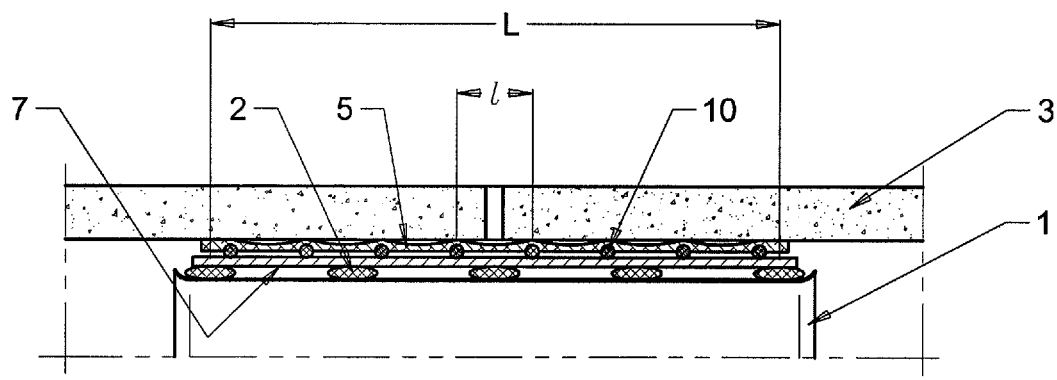
FIG. 8 is a longitudinal sectional view of the sleeve layers illustrating additional layer of the O-rings in accordance with another embodiment of the present invention.

FIG. 8 illustrates yet another embodiment of the invention where the reinforcement band 7 is placed between the O-rings 2 and the resilient membrane 5, and the additional layer of O-rings 10 from solid resilient material is placed between the reinforcement band 7 and the resilient membrane 5 in order to restrict infiltration pressure between two adjacent O-rings 10.

Figure 9:
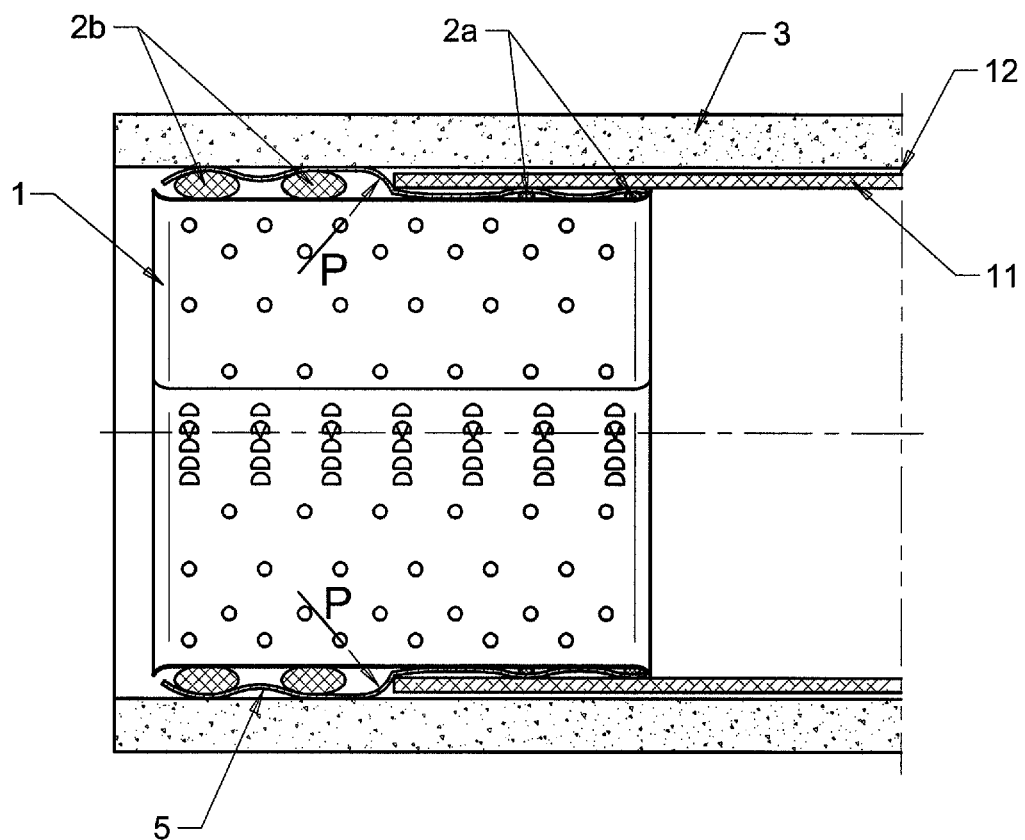
FIG. 9 is a longitudinal sectional view, which demonstrates the sealing concept for the ends of CIPP liner with the relatively high internal operating pressure.

FIG. 9 illustrates the sealing concept for the ends of the CIPP liner 11 with the leaking gap 12 between the host pipe 3 and the liner 11 subjected to relatively high internal operating pressure P. This repair apparatus is similar to that which is shown in FIGS. 1, 2, and 3, but has, as a rule, solid resilient O-rings 2a and 2b with different body diameters.

Figure 10:
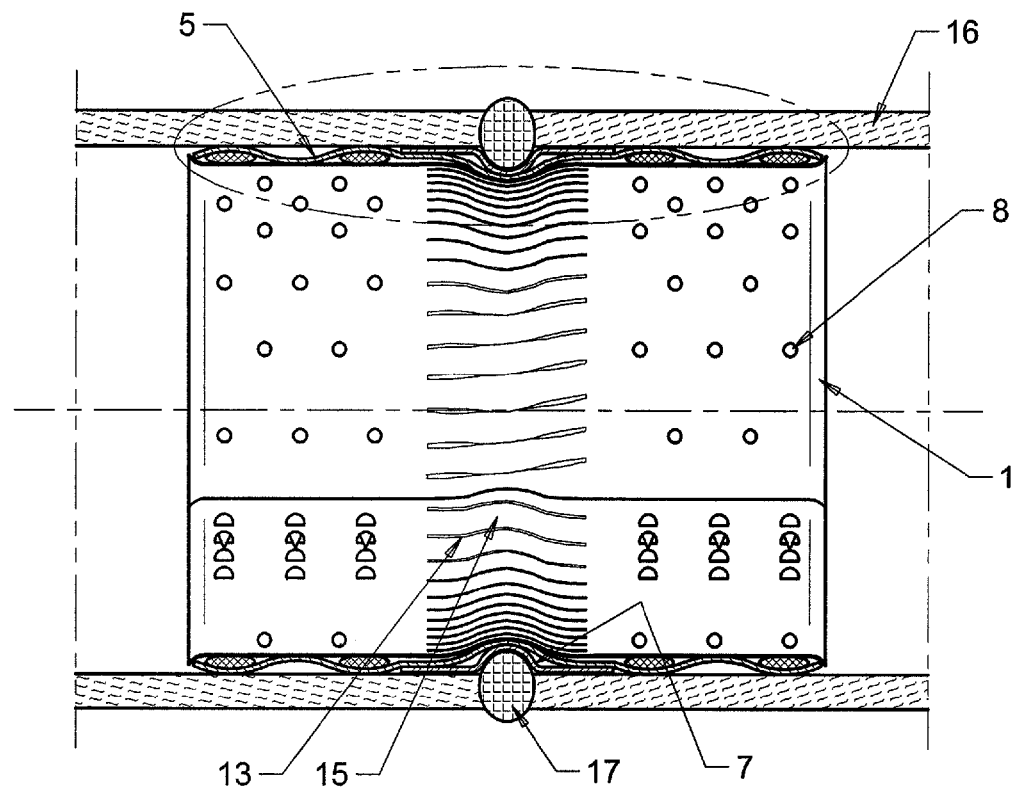
FIG. 10 is a longitudinal sectional view of the sleeve layers installed in a conduit with protruding welding bead, this view showing the use of the slotted expandable core shown in FIG. 13 and the slotted reinforcement band shown in FIG. 12 in unfolded shapes.
Figure 11:
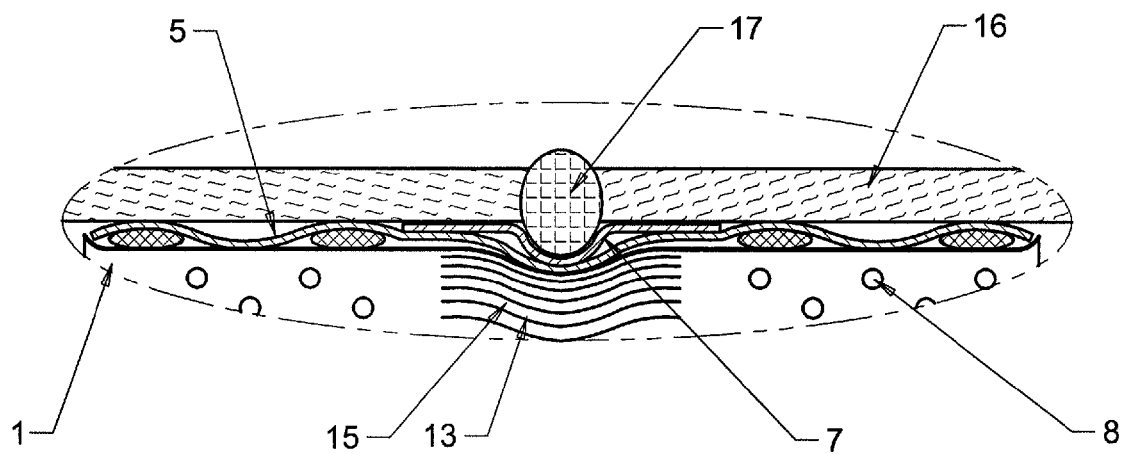
FIG. 11 is an enlarged and more detailed view of the longitudinal section of FIG. 10.

FIGS. 10 and 11 in accordance with yet another embodiment of the invention show the repair apparatus in which some of the perforations 8 in the reinforcement band 7 and in the expandable core 1 are made as elongated slots 13 and strips 15, which allow the core 1 to envelop (or to fit tightly) a circumferentially protruded welding bead 17.

Figure 12:
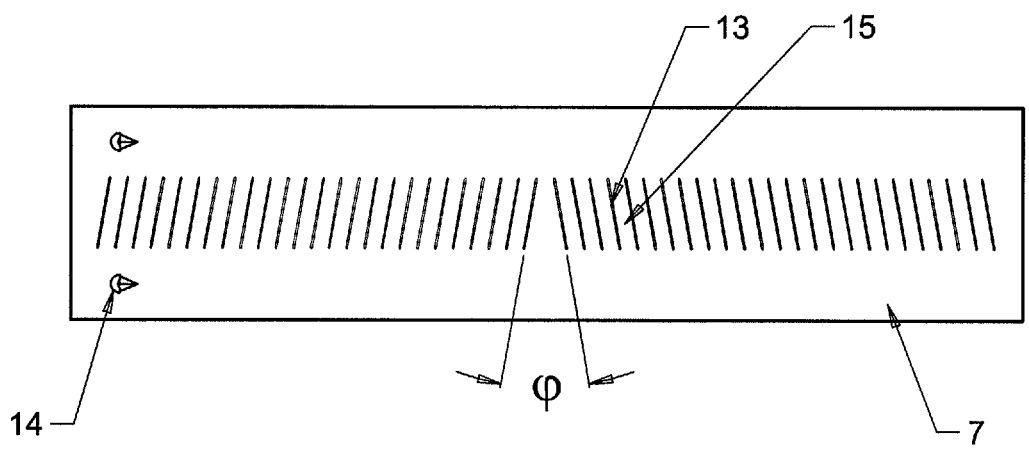
FIG. 12 shows an uncoiled perforated reinforcement band with slots and simple locking mechanism.

FIG. 12 shows a flat, not yet coiled, reinforcement band 7 having elongated narrow slots 13. According to a particular embodiment of the invention, the reinforcement band 7 is equipped with a locking mechanism 14. In yet another aspect of the invention, some of the slots 13 are oriented under a slight angle γ towards other slots.

Figure 13:
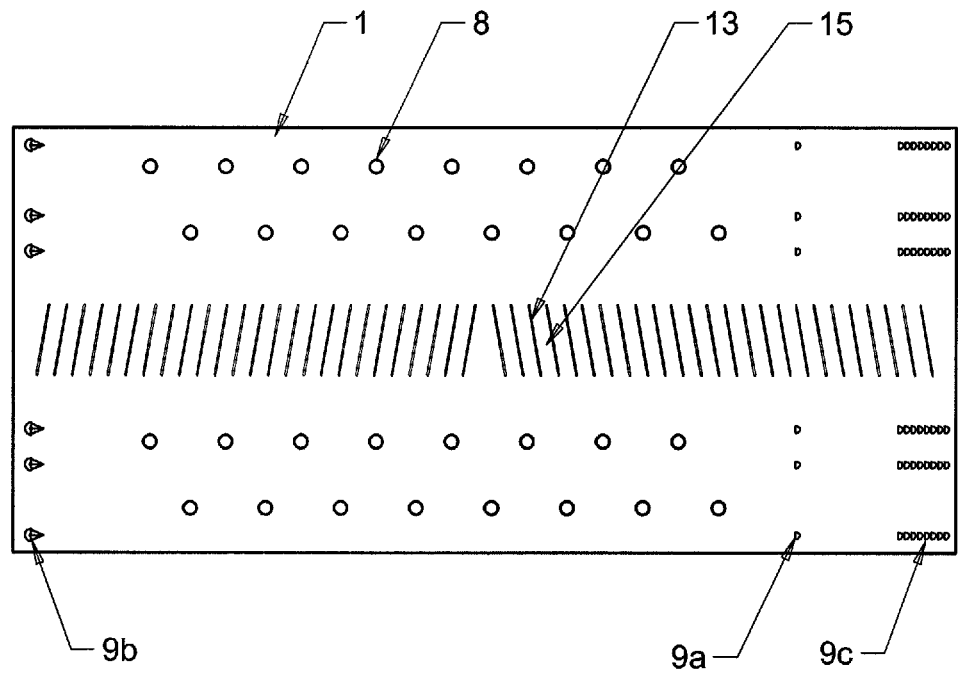
FIG. 13 illustrates an uncoiled perforated sleeve with slots, round holes, and step locking mechanism.

FIG. 13 shows a flat, not yet coiled, expandable core 1 having perforations 8 wherein a number of the perforations are round and a number are shaped as elongated narrow slots 13. Each of the plurality of slots 13 is shown in FIG. 13 to extend generally transversely of the length of the flat core, whereas, as a group, the slots 13 form a band of successive slots along the length of the flat core and along a center area of the flat core. The locking device here is represented as a step mechanism having tips 9b, a set of holes 9c, and holes 9a (similar to that shown in FIG. 2) for keeping the repair apparatus in the over-coiled pre-installation configuration depicted in FIG. 1.

Figure 14:
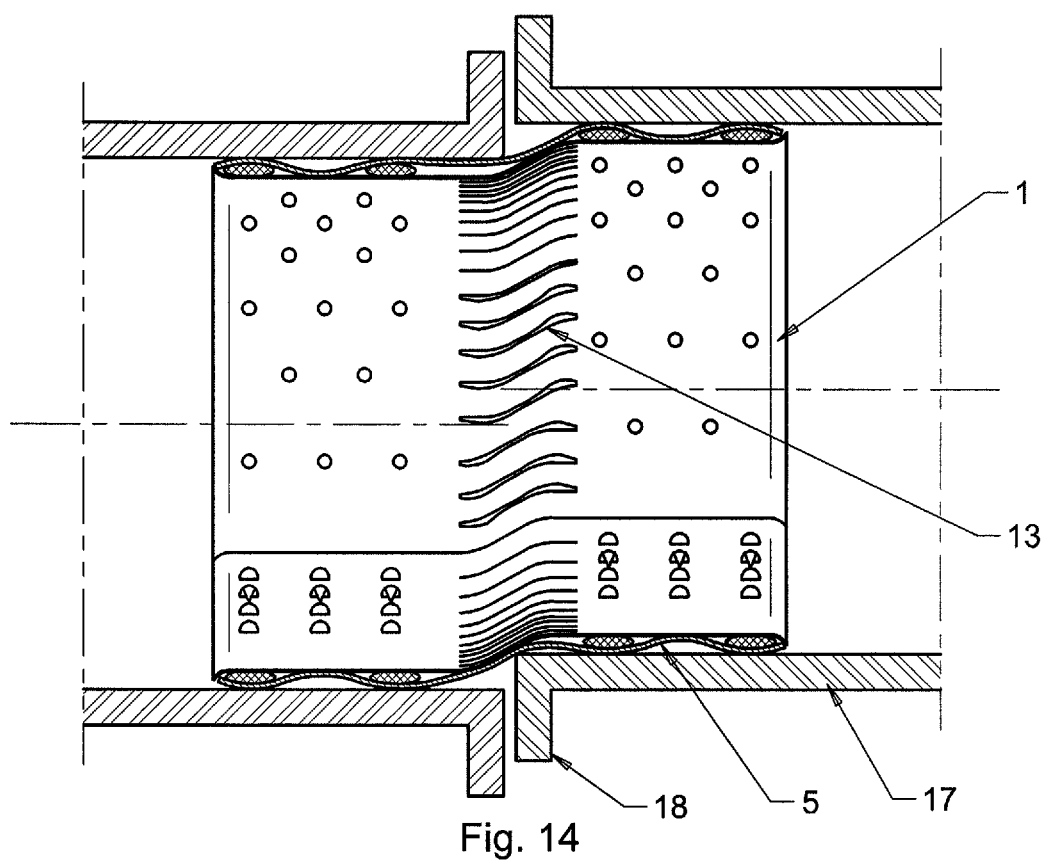
FIG. 14 is a longitudinal sectional view of the sleeve with slotted expandable core, the set of O-rings, and the sealing resilient membrane, installed in a conduit with an offset joint.

FIG. 14 illustrates the repair apparatus having the expandable core 1 with the slots 13 which (the core 1) is installed in the conduit 17 having an offset joint 18.

Figure 15:
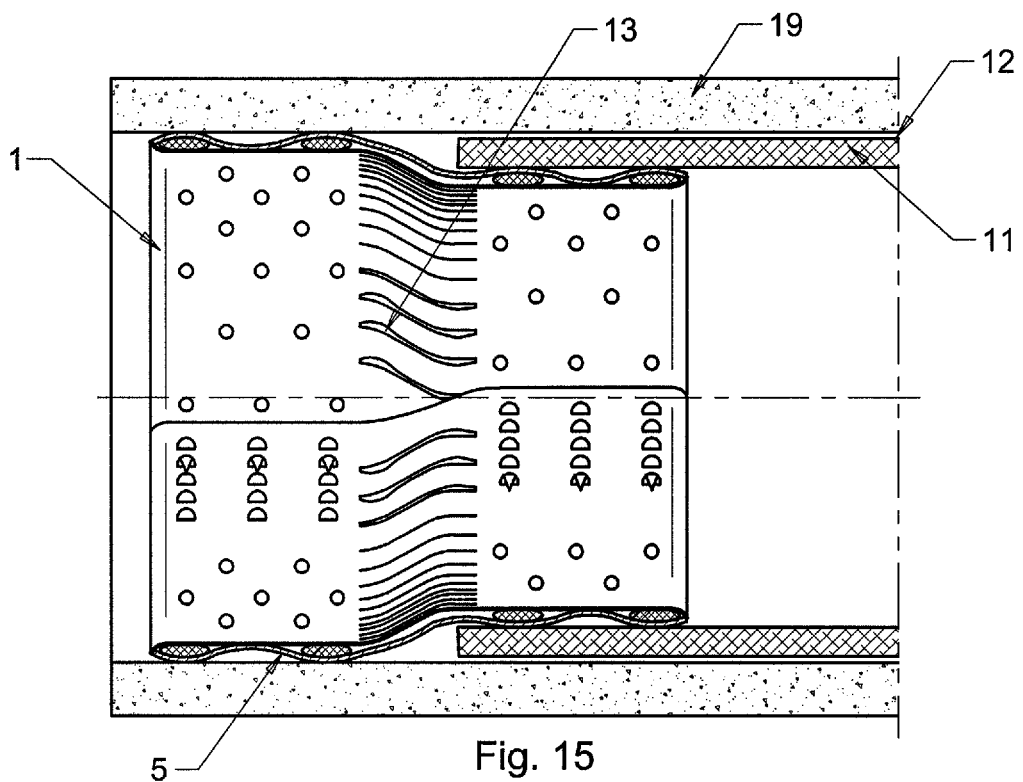
FIG. 15 is a longitudinal sectional view of the sleeve with slotted expandable core, the set of O-rings, and the sealing resilient membrane, installed in a conduit with two different pipe diameters.

FIG. 15 shows the repair apparatus having the expandable core 1 with the slots 13 where the core 1 is installed in the conduit 19 with two different pipe diameters. In the particular case shown in FIG. 15, the smaller pipe is depicted as the CIPP liner 11 or, in other words, FIG. 15 represents another sealing configuration for the ends of the liner 11, compared, e.g., to FIG. 9.

The aforementioned apparatus operates in the manner described below.

First, the apparatus for internal repair of pipes and conduits is prepared in the over-coiled pre-installation configuration, which can be determined by the pre-locked position 9a (see FIG. 1). In this position, the resilient membrane 5 can be kept under light tension, ensuring the light protrusion from the underlying O-rings 2. In accordance with another aspect of the invention, a curable flexible sealant can be applied directly on the sealing membrane 5, especially in the areas where the membrane 5 has the protruding undulations caused by the O-rings 2. The conduit repair apparatus is then positioned within the host pipe 3, in a manner which is known in the art.

Next, the repair apparatus is expanded, also in a known manner, to engage the locking members 9 to lock the repair apparatus into a tubular configuration. The installed repair apparatus diameter and installation pressure are chosen to be sufficient to compress the O-rings 2 as much as needed to satisfy the following conditions:

In the case of pressure pipe repair, O-rings 2 should be still kept in the compressed, oval shape 2b (see FIG. 3) even if service pressure is applied, and host pipe diameter is expanded under the pressure;

The same condition as above, except where temperature changes and pressure is constant, or both pressure and temperature change;

In the case of infiltration pressure, the O-rings 2 should be compressed enough to resist the pressure and to prevent through gap creation between the repair apparatus and the host pipe 3;

In the case of the curable sealant expanding into the leaking hole or open joint 6, a certain quantity of sealant should be added and/or installed; repair apparatus diameter has to be considered.

Further, with reference to FIGS. 2 and 3, the repair apparatus is installed, and after one hour, for instance, the sealant is cured and becomes flexible. Now, the host pipe 3 is put into service, and internal pressure is applied through the open perforations 8 to the sealing membrane 5, causing the membrane 5 to be pressed even tighter to the wall of the host pipe 3, thereby preventing conduit-conveyed fluid from escaping from the conduit at the repair site. In accordance with this embodiment of the invention, two following conditions will be satisfied:

In the case of the internal surface quality of the host pipe 3 being good, the need of the sealant application can be avoided, because of the self-sealing principle of the repair apparatus;

In the case of a change in the diameter of the host pipe 3, the membrane 5 diameter and flexible sealant dimensions will be changed simultaneously. For instance, this situation typically occurs with CIPP liner in pressurized pipes, as shown in FIG. 9.

Reference is made to commonly owned U.S. Pat. No. 5,351,720, the disclosure of which is hereby incorporated by reference thereto in its entirety, for examples of transporting a repair apparatus, including a coiled sleeve, transporting the apparatus to a repair site, as well as expanding and locking the sleeve in an installation position.

Figure 4:
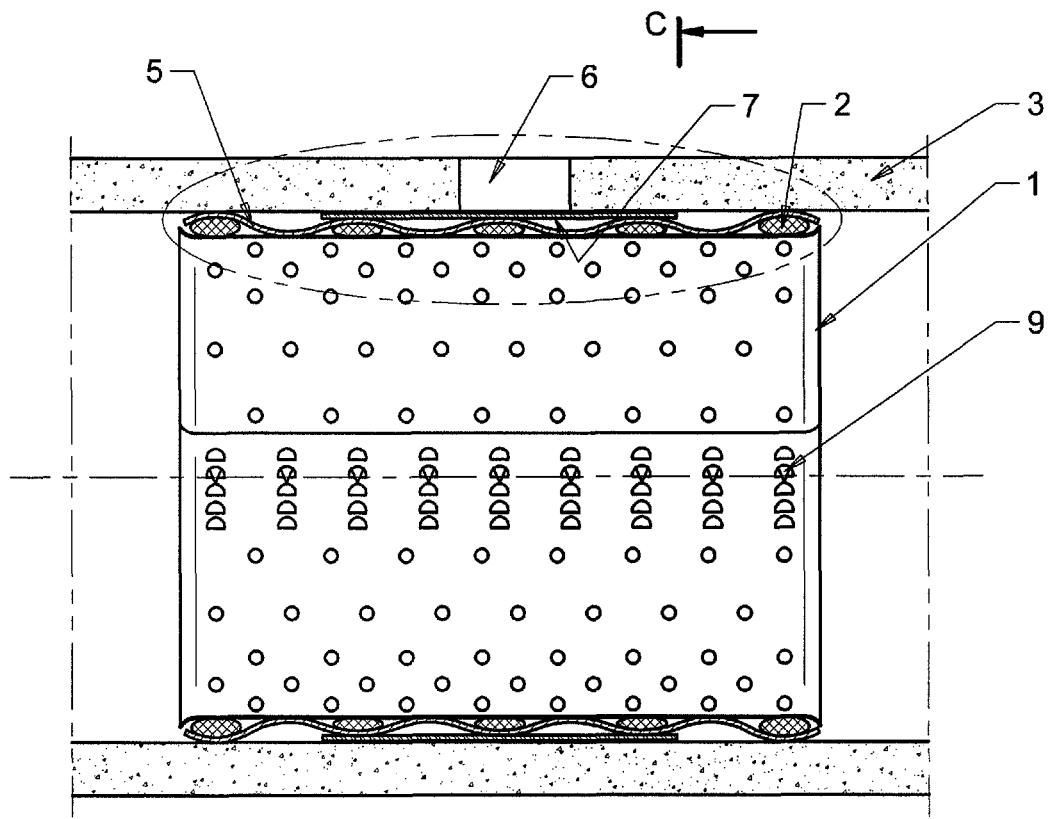
FIG. 4 is a longitudinal section of the same sleeve illustrating additional reinforcement band.
Figure 5:
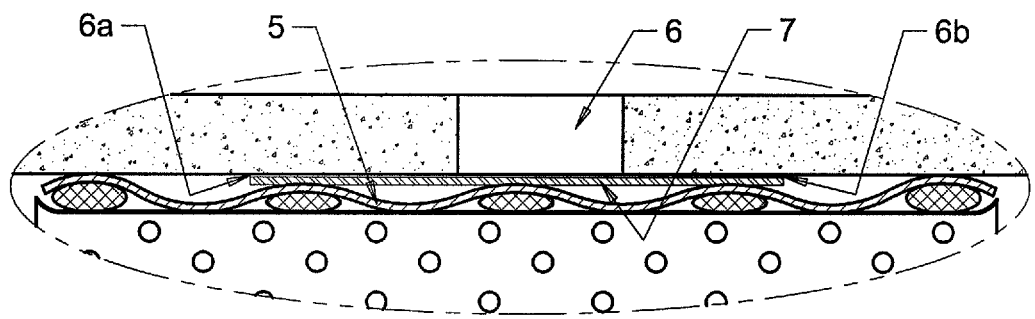
FIG. 5 is an enlarged and more detailed view of the longitudinal section of FIG. 4, with additional reinforcement band, before internal operating pressure is applied.
Figure 6:
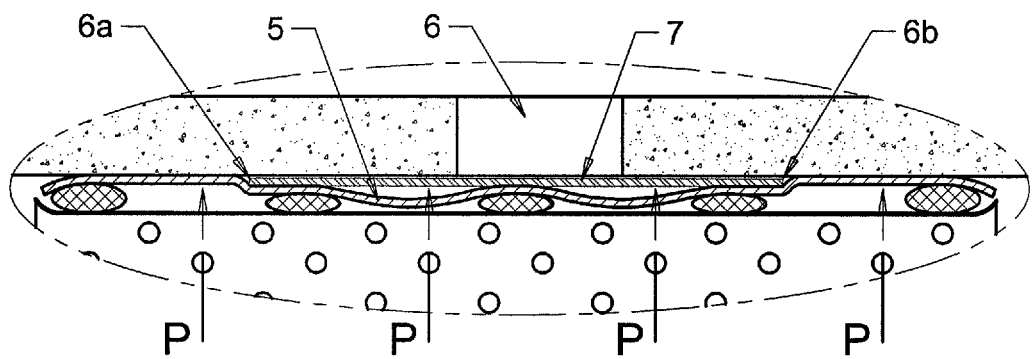
FIG. 6 is the same enlarged view, with additional reinforcement band, after internal operating pressure was applied.
Figure 7:
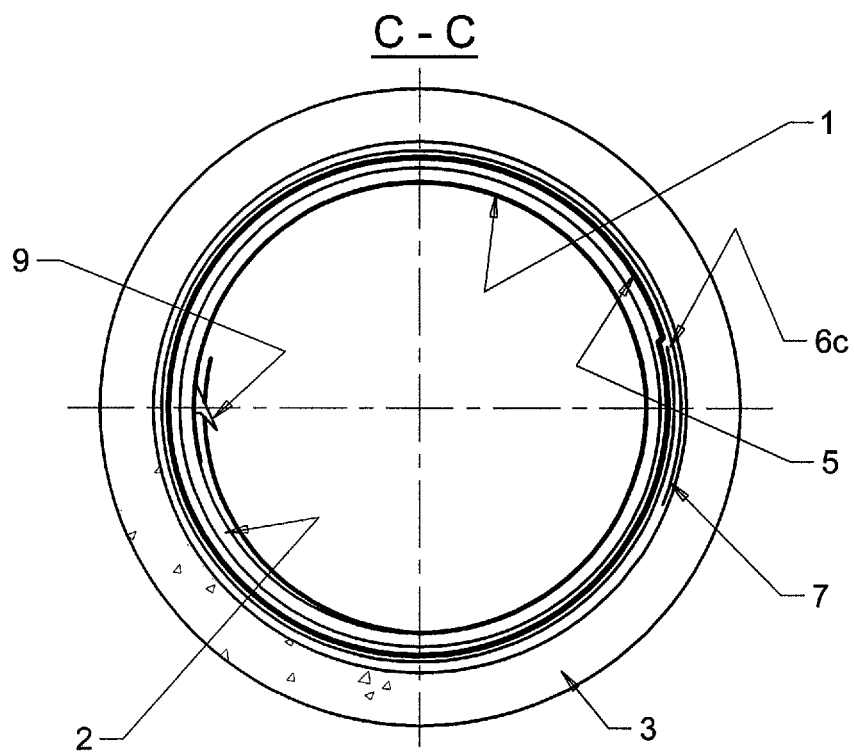
FIG. 7 is a cross-sectional view, taken along the line C-C of FIG. 4, which demonstrates the sealing principle of the resilient membrane in the area of the reinforcement band overlapped edges.

In accordance with another embodiment of the invention, the reinforcement band 7 is applied over the membrane 5 (see FIG. 4). In this case, the installed repair apparatus can withstand high operation pressure P and/or can restore host pipe with the large leaking hole 6 or wide leaking joint 6. It becomes possible, because a bigger damaged area 6 will be transformed to the negligible leaking gaps 6a and 6b in the longitudinal direction (see FIGS. 5 and 6) and leaking gap 6c between the overlapped edges of the reinforcement band 7 in the circumferential direction (see FIG. 7).

And again, the working pressure P is equally applied to the both sides of the core 1, because of the open, and unblocked, perforations 8. This maneuver makes the core 1 independent from internal or external pressure changes, or temperature changes. Yet, the core 1 could not be unlocked, because it is externally loaded from the set of O-rings 2, which is kept under compression between bounds 2a and 2b (see FIG. 3). However, the total area of the perforations has to be relatively large enough, in the case of water hammer probability, to accommodate sudden pressure change by rapidly equalizing the pressure applied to the both sides of the core 1.

In yet another embodiment of the invention, the reinforcement band 7 is placed between the O-rings 2 and the resilient membrane 5, and the additional layer of O-rings 10, made from solid resilient material, placed between the reinforcement band 7 and the resilient membrane 5 in order to restrict infiltration pressure between two adjacent O-rings 10. In accordance with this embodiment of the invention, shown in FIG. 8, the installed apparatus for internal repair of pipes and conduits resists high infiltration pressure, because of additional layer of O-rings 10 located between reinforcement band 7 and resilient membrane 5. In this case, the set of O-rings 10 is pressing the resilient membrane 5 with high local pressure, and relatively high infiltration pressure is confined between two neighboring random O-rings 10. FIG. 8 shows that the pressure applied to the whole apparatus is smaller than the infiltration pressure in direct ratio of l/L, where "l" is the longitudinal distance between two neighboring O-rings 10, and "L" is the longitudinal distance between outermost O-rings 2.

In another aspect of the invention, the repair apparatus shown in FIGS. 1, 2 and 3, can be used to stop leaking through annular gap 12 (see FIG. 9) between host pipe 3 and CIPP liner 11 subjected to relatively high internal operating pressure P. In this embodiment of the invention each of the set of O-rings 2a has a smaller body diameter than those of another set of O-ring 2b in order to accommodate a difference in the diameters of the host pipe 3 and the CIPP liner 11. In this case working pressure P is applied through the perforations 8 in the expandable core 1 to the resilient membrane 5 and simultaneously expands the membrane 5 and CIPP liner 11. At the same time the membrane 5 seals the leaking gap 12, the CIPP portion with variable diameter, and the host pipe portion with stable diameter. In this application, a curable flexible sealant can be applied directly on the sealing membrane 5, especially in the event the pressure pipe is placed out of service, and infiltration pressure will be applied.

In yet another aspect of the invention, the repair apparatus shown in FIGS. 1 through 4 can be used to stop leaking in pipes and conduits which are out of usual condition, for instance offset joints, joints between pipes/conduits having different diameters, circumferential protrusions such as welding beads, or combinations of abnormal shapes. In this embodiment of the present invention, some of the perforations 8 in the reinforcement band 7 and in the expandable core 1 are made as elongated slots 13 and strips 15 (see FIGS. 10 through 15). The use of the slotted core 1 and band 7 allows the plastic shaping of the repair apparatus along with the irregularities of the conduits.

According to a particular embodiment of the invention, the reinforcement band 7 is equipped with a locking mechanism 14 (see FIG. 12), which allows the installation of the coiled reinforcement band 7 separately, i.e., before the rest of the repair apparatus shown in FIG. 10. This technique makes the shaping of the repair apparatus much easier. In another aspect of the invention, some of the slots 13 are oriented under a slight angle $\phi$ towards the other slots (see FIGS. 12 and 13). This technique prevents the reinforcement band 7 or the expandable core 1 from sticking between the slots 13 and strips 15 at the time of installation that may happen if the slots were parallel.

The width of the slots 13 of the reinforcement band 7 depends on operating pressure in the conduit and should not allow the resilient membrane 5 (see FIGS. 10 and 11) to be extruded into the slots 13 of the reinforcement band 7. From another side, the total width of all strips 15 should be smaller than the smallest perimeter in the conduit 16 (which is measured along the crest of the welding bead 17 shown in FIGS. 10 and 11). This dilemma could be resolved by regulating the quantity of strips 15. At the same time, the width of each strip 15 depends upon the complexity of the shape of the conduit.

All considerations applied to the slots 13 and the strips 15 design for the reinforcement band 7 (see FIG. 12) are applicable for the expandable core 1 (see FIG. 13) as well. The only difference is that the width of the slots 13 of the expandable core 1 depends on an infiltration pressure, but it does not depend on the internal operating pressure.

Similar considerations apply to the slots 13 and the strips 15 design in the cases of offset joints (see FIG. 14), different diameter joints (see FIG. 15) and all combinations of abnormal shapes. As can be seen in FIGS. 14 and 15, the core 1 bridges the conduit joint in the area of the successive slots 13. In any of the mentioned cases, the slotted reinforcement band 7 (see FIG. 12), which is shown in FIGS. 10 and 11, and not shown in FIGS. 14 and 15, could be used as well, especially when a high operating pressure is applied and/or a conduit has a big leaking hole or a wide leaking joint.

The invention illustratively disclosed herein suitably may be practiced in the absence of any element which is not specifically disclosed herein.

The invention is not limited to the particular embodiments that have just been described, and their particular details. Instead, the invention encompasses all of that which falls within the scope of the following claims, as well as any and all equivalents thereof.

The invention claimed is:

1. An apparatus for internal repair of pipes and conduits comprising:
   a metal core coiled around a longitudinal axis adapted to be installed within a conduit at a repair site;
   a sealing structure surrounding said core, said sealing structure designed to prevent conduit-conveyed fluid from escaping from the conduit at the repair site, said sealing structure comprising:
      a plurality of solid resilient O-rings applied over the outer surface of the core;
      a resilient sealing membrane applied over the O-rings; and
      a reinforcement band applied over the resilient sealing membrane;
   said metal core being structured and arranged to be moved from a coiled pre-installed configuration to an expanded, coiled, and sealed installed configuration;
   said core comprising pressure-equalizing open perforations extending through the metal core, said pressure-equalizing open perforations being structured and arranged to equalize internal pressure with an external pressure around said core during both (1) said movement from the pre-installed configuration to the installed configuration, and (2) after said movement, while in the installed configuration;

said pressure-equalizing open perforations comprising a plurality of perforations extending along a majority of a circumference of the metal core.

2. A repair apparatus according to claim 1, wherein:
said perforations comprise elongated slots, with strips between respective successive slots, to allow shaping of the apparatus by replicating, at the repair site, a shape of an abnormality along a surface of the conduit or at a joint within the conduit.

3. A repair apparatus according to claim 1, wherein:
said core comprises a rolled stainless steel sheet.

4. A repair apparatus according to claim 1, wherein:
said reinforcement band comprises elongated slots, with strips between respect successive slots, to allow shaping of the apparatus by replicating, at the repair site, a shape of an abnormality along a surface of the conduit or at a joint within the conduit.

5. A repair apparatus according to claim 1, wherein:
said sealing structure comprises a reinforcement band applied between the resilient sealing membrane and the O-rings.

6. A repair apparatus according to claim 1, wherein:
said sealing structure comprises a curable flexible sealant applied on the sealing membrane.

7. A repair apparatus according to claim 5, wherein:
said sealing structure comprises an additional layer of O-rings applied between said reinforcement band and said resilient sealing membrane.

8. A repair apparatus according to claim 1, wherein:
said core comprises outward bent circumferential edges to create smooth transition from said conduit diameter to a diameter of the core.

9. A repair apparatus according to claim 1, wherein:
said sealing structure comprises said solid resilient O-rings with different body diameters.

10. A method of the internal repair of a conduit using the apparatus of claim 1, said method comprising:
(a) applying the resilient sealing membrane around the core and over the O-rings;
(b) inserting said repair apparatus, having said metal core, and said sealing structure applied thereto, within the conduit at the site of repair;
(c) expanding said repair apparatus to lock said apparatus into a tubular installation configuration and to compress said sealing structure between inner surface of the conduit and said sealing structure;
(d) locking said repair apparatus into the tubular configuration at installation pressure, while allowing equalization of pressure internal and external of said core sleeve via the open perforations, and satisfying the following conditions:
(i) for pressure pipe repair, said O-rings surrounding said core are maintained in a compressed condition even when a service pressure is applied in the conduit, and when conduit diameter is expanded under said pressure;
(ii) same as condition (i), except where temperature changes and pressure is constant, or where both pressure and temperature change;
(iii) under infiltration pressure, said O-rings are compressed sufficiently to resist said pressure and to prevent gap creation between the repair apparatus and the conduit.

11. A repair method according to claim 10, further comprising:
before inserting said repair apparatus, applying a resilient curable sealant over the resilient sealing membrane.

12. A repair method according to claim 10, wherein:
said pressure-equalizing open perforations extend through the metal core; said pressure-equalizing open perforations comprise a plurality of perforations extending along a majority of a circumference of the metal core.

13. A repair method according to claim 10, wherein:
said plurality of perforations are round perforations.

14. A repair method according to claim 10, wherein:
said pressure-equalizing open perforations include round perforations and slot-shaped perforations.

15. A repair method according to claim 14, wherein:
the slot-shaped perforations form a band of successive slots;
said inserting of the repair apparatus comprises inserting the repair apparatus so that the band of successive slots bridge a joint of the conduit.

16. A repair method according to claim 10, wherein:
said pressure-equalizing open perforations are unblocked in the installation configuration.

17. A repair apparatus according to claim 1, wherein:
said pressure-equalizing open perforations are unblocked in the installed configuration of the metal core.

18. A repair apparatus according to claim 1, wherein:
said perforations include round perforations.

19. A repair apparatus according to claim 2, wherein:
in addition to said elongated slots, said perforations include round perforations.

20. An apparatus for internal repair of conduits for conveying fluids, said apparatus comprising:
a metal core coiled around a longitudinal axis adapted to be installed within a conduit at a repair site;
the metal core being structured and arranged to be moved from a coiled pre-installed configuration to an in-use expanded, sealed, and installed configuration;
in the in-use expanded, sealed, and installed configuration, a sealing structure surrounds the core, the sealing structure comprising:
a plurality of resilient O-rings applied over the outer surface of the metal core; and
a resilient sealing membrane applied over the O-rings;
the metal core comprising open perforations extending through the metal core, the open perforations being structured and arranged to allow fluids, conveyed through the metal core while the metal core is in the in-use expanded, sealed, and installed configuration, to move through the open perforations and to expand the resilient sealing membrane toward the conduit at the repair site;
said pressure-equalizing open perforations comprising a plurality of perforations extending along a majority of a circumference of the metal core.

21. An apparatus for internal repair of fluid-carrying pipes and conduits, said apparatus comprising:
a metal core coiled around a longitudinal axis adapted to be installed within a conduit at a repair site;
a sealing structure surrounding said core, said sealing structure further comprising:
a plurality of solid resilient O-rings applied over the outer surface of said core; and a resilient sealing membrane applied over the O-rings; and a reinforcement band applied over the resilient sealing membrane and the O-rings;

said metal core being structured and arranged to be moved from a coiled pre-installed configuration to an expanded and installed configuration;

said core comprising pressure-equalizing open perforations extending through the metal core designed to allow fluid carried by the conduit to flow through said perforations in said installed configuration and apply fluid operating pressure against the resilient sealing membrane in a direction against the conduit, said pressure-equalizing open perforations equalizing fluid operating pressure within the metal core with the fluid operating pressure outside of the metal core;

said pressure-equalizing open perforations comprising a plurality of perforations extending along a majority of a circumference of the metal core;

the metal core further comprising a self-actuable locking assembly to lock respective edge regions of the core in the installed configuration; and the O-rings are positioned to apply an external loading to the core, thereby retaining the core locked in the installed configuration.

22. A repair apparatus according to claim 1, wherein:

the repair apparatus comprises means for preventing water from passing from the core through the sealing structure to the conduit at the repair site.

23. A repair apparatus according to claim 22, wherein:

said means comprises a resilient sealing membrane surrounding the core.

24. A repair apparatus according to claim 23, wherein:

the resilient sealing membrane is made of rubber.

25. A repair apparatus according to claim 1, wherein:

the sealing structure does not include a curable sealant.

26. A repair apparatus according to claim 1, wherein:

the resilient sealing membrane has protruding undulations along a length of the core creating by the O-rings being spaced along the length of the core.

27. A repair method according to claim 11, wherein:

said resilient curable sealant comprises a sealant that is resilient and elastic after curing.

28. A repair method according to claim 10, wherein:

no resilient curable sealant is applied over the resilient sealing membrane.

\* \* \* \* \*